(12) United States Patent
Dons et al.

(10) Patent No.: US 10,620,333 B2
(45) Date of Patent: Apr. 14, 2020

(54) METHOD AND NODE DEPLOYER FOR SEISMIC SURVEYS

(71) Applicant: MAGSEIS AS, Lysaker (NO)

(72) Inventors: Karsten Dons, Kongsberg (NO); John Emil Halden, Kongsberg (NO); Nils Halvor Heieren, Oslo (NO)

(73) Assignee: MAGSEIS AS, Lysaker (NO)

( * ) Notice: Subject to any disclaimer, the term of this patent is extended or adjusted under 35 U.S.C. 154(b) by 9 days.

(21) Appl. No.: 15/518,783

(22) PCT Filed: Oct. 24, 2015

(86) PCT No.: PCT/NO2015/050197
§ 371 (c)(1),
(2) Date: Apr. 13, 2017

(87) PCT Pub. No.: WO2016/064280
PCT Pub. Date: Apr. 28, 2016

(65) Prior Publication Data
US 2017/0235005 A1  Aug. 17, 2017

(30) Foreign Application Priority Data

Oct. 24, 2014 (NO) .................................... 20141275
Oct. 23, 2015 (NO) .................................... 20151440

(51) Int. Cl.
*G01V 1/38* (2006.01)
*B63C 11/40* (2006.01)

(52) U.S. Cl.
CPC .......... *G01V 1/3852* (2013.01); *G01V 1/3808* (2013.01); *G01V 1/3843* (2013.01); *B63C 11/40* (2013.01); *G01V 2210/1427* (2013.01)

(58) Field of Classification Search
CPC .. G01V 1/3852; G01V 1/3843; G01V 1/3808; G01V 2210/1427; B63C 11/40
See application file for complete search history.

(56) References Cited

U.S. PATENT DOCUMENTS 4,404,664 A * 9/1983 Zachariadis ............. B63G 8/42
114/246
8,087,848 B2 * 1/2012 Thompson .............. B63B 21/66
405/166

(Continued)

FOREIGN PATENT DOCUMENTS

EP        2712802      4/2014
WO    2010025283      3/2010

OTHER PUBLICATIONS

International Search Report issued in PCT/NO2015/050197, dated Jan. 21, 2016, pp. 1-2.

(Continued)

*Primary Examiner* — Ian J Lobo
(74) *Attorney, Agent, or Firm* — Jeffrey S. Melcher; Melcher Patent Law PLLC

(57) ABSTRACT

The invention relates to a method for seismic survey by autonomous seismic nodes (1) at a sea floor (2), comprising: —attaching the seismic nodes (1) to a rope (3); —loading the rope (3) with the seismic nodes into a node deployer (4); —lowering the node deployer (4) into the sea (5); —towing the node deployer (4) above the sea floor (2); —deploying the rope (3) with the seismic nodes (1) at the sea floor (2); —collecting seismic data by the seismic nodes (1); —retrieving the rope (3) with the seismic nodes (1) from the sea floor (2), and —unloading seismic data from the seismic nodes (1). The invention also relates to a node deployer (4) for deploying a rope (3) with seismic nodes (1) at the sea floor (2), comprising a magazine (7) for the rope (3) with the seismic nodes (1).

28 Claims, 5 Drawing Sheets

(56) References Cited

U.S. PATENT DOCUMENTS

| | | | | |
|---|---|---|---|---|
| 8,427,900 | B2* | 4/2013 | Fleure | G01V 1/201 |
| | | | | 367/15 |
| 9,075,165 | B2* | 7/2015 | Vageskar | G01V 1/3808 |
| 2005/0276665 | A1 | 12/2005 | Entralgo | |
| 2008/0192570 | A1* | 8/2008 | Lennart Tenghamn | |
| | | | | G01V 1/3826 |
| | | | | 367/17 |
| 2008/0267009 | A1* | 10/2008 | Frivik | G01V 1/3843 |
| | | | | 367/15 |
| 2010/0157727 | A1* | 6/2010 | Woodard, Jr. | B63C 11/52 |
| | | | | 367/15 |
| 2011/0176383 | A1* | 7/2011 | Jewell | G01V 1/3852 |
| | | | | 367/16 |
| 2014/0211589 | A1* | 7/2014 | Maxwell | G01V 1/18 |
| | | | | 367/15 |
| 2016/0041280 | A1* | 2/2016 | Naes | G01V 1/18 |
| | | | | 367/149 |

OTHER PUBLICATIONS

Written Opinion issued in PCT/NO2015/050197, dated Jan. 21, 2016, pp. 1-3.

* cited by examiner

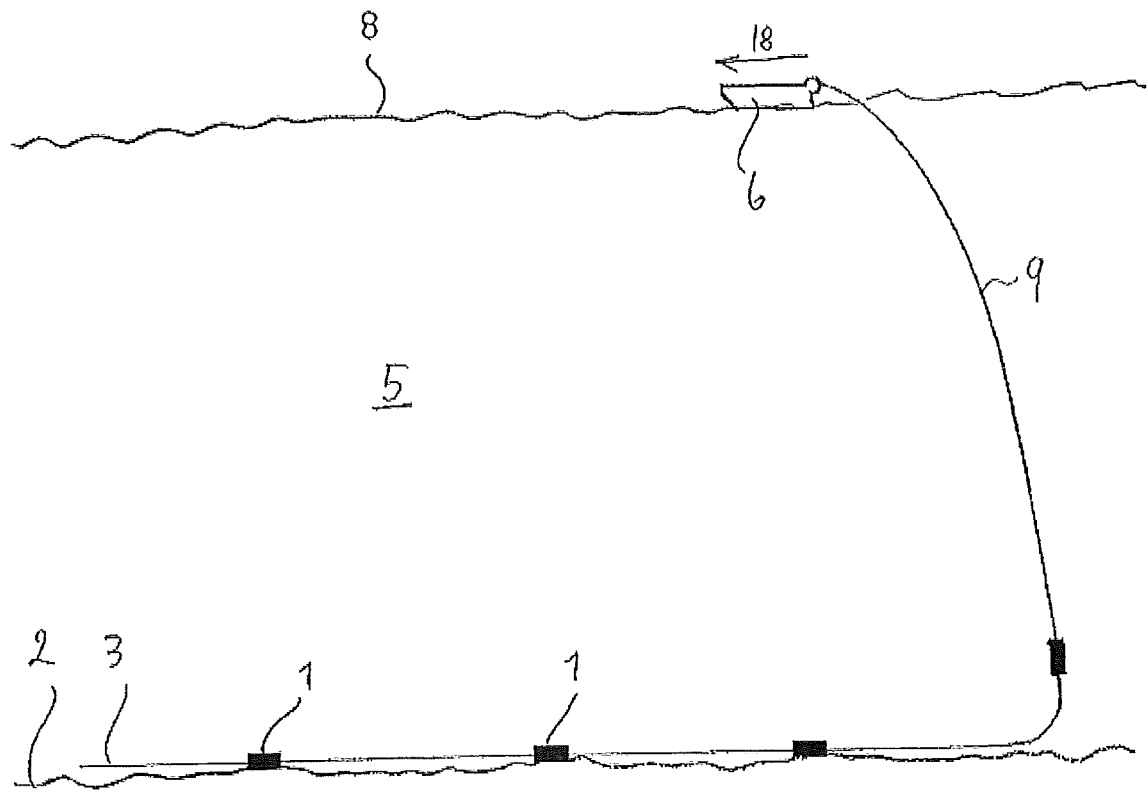
Fig. 3
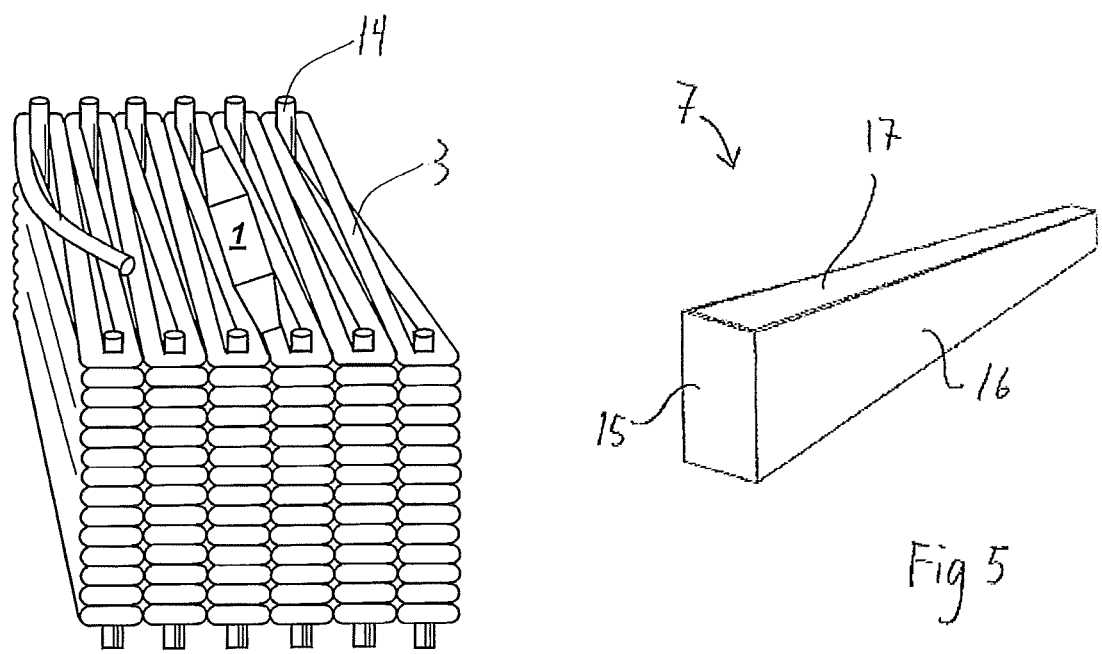
Fig 4
Fig 5

METHOD AND NODE DEPLOYER FOR SEISMIC SURVEYS

The invention relates to a method for seismic survey by autonomous seismic nodes at a sea floor. The invention also relates to a node deployer for subsea towing above a sea floor, for deploying a rope with seismic nodes at the sea floor.

A seismic survey at sea involves firing an array of acoustic sources, for example airguns, at a known position in a so-called shot. Acoustic waves from the airguns travel through the water into a subterranean formation, where they are reflected and refracted from various layers in the formation. The reflected and refracted waves are detected and recorded for later analysis in order to provide information about the subterranean structure or formation.

In order to detect as much as possible of the reflected and refracted waves, seismic sensors such as geophones have to be planted in close acoustic contact with the seafloor, and hydrophones in a position just above the seafloor. The seismic sensors are conventionally arranged in seismic nodes, each node comprising one or more seismic sensors.

In order to perform such a seismic survey, an array of seismic nodes is deployed on the seafloor. The array may be arranged as a rectangular grid with a seismic node at each crossing. Typical distances are between 25 and 400 metres between adjacent nodes along a line and 100 to 800 metres between the lines. After the nodes are deployed, a source vessel towing acoustic sources fires a series of shots at known positions. The seismic response signals from each shot are detected at each node of the array. Each node may perform some signal processing. When the desired shots are performed, the nodes are retrieved and stored for deployment in the next survey.

The nodes may be deployed or planted one by one, e.g. by a Remotely Operated Vehicle (ROV), or they may be connected by an Ocean Bottom Cable (OBC), typically at intervals of 12.5, 25 or 50 metres. An OBC facilitates retrieval, as single, small nodes might otherwise be difficult to locate and collect. Several OBCs may be deployed parallel to each other such that the nodes form the desired array on the seafloor.

An OBC may also provide communication lines such that each node can transmit seismic data to a survey vessel in real-time. Examples can be found, for example, in U.S. Pat. Nos. 4,942,557 and 4,780,863. One shortcoming of these methods and devices is that a communication line must pass through a housing from the sensors and controllers in the node to a transceiver or receiver on the survey vessel. When the depth of deployment increases, either the risk of leakage through the opening for the communication line increases or the cost of sealing the housing increases. Another shortcoming is that a cable stretching from the seafloor to the surface may induce motion, vibrations and other noise that disturb the measurements taken by the seismic sensors within the nodes.

To overcome these shortcomings, each node may be autonomous, i.e. remain incommunicado with the survey vessel for the duration of a survey. An autonomous seismic node comprises seismic sensors, a recorder, a memory for storing the seismic signals and a power source, e.g. a battery pack, to supply the node with power during the survey. After retrieval, the seismic data are transferred to the survey vessel for later analysis.

US patent application 2013/0058192 to Gateman et al. and assigned to the applicant for the present disclosure discloses an ocean bottom seismic cable with autonomous node capsules that are inserted into corresponding casings mounted along the OBC cable. In this application, the OBC(s) is/are deployed from a vessel, and thus subject to vertical forces caused by several nodes, each having negative buoyancy, suspended from the vessel. As the nodes are disposed at regular intervals along the OBC, the vertical forces increase with the depth to the seafloor. In addition, an OBC suspended from a vessel is subject to horizontal forces from underwater currents. As the depth increases, these forces are likely to cause deviations from a desired path on the seafloor.

However, in order to estimate the depth of a reflecting layer from a time delay between a shot and the response, the distance between the source and node must be known. Hence, the node positions must be accurate in order to provide an accurate image of the formation. Further, fixed intervals between adjacent nodes minimizes errors when interpolating seismic data because an interpolated value between two adjacent nodes far apart is less accurate than an interpolated value between two adjacent nodes close to each other. Hence, nodes should be deployed at regular intervals at known locations in order to obtain the best possible survey with a predetermined number of nodes. The ability to position the seismic nodes with high accuracy at the seafloor is also very important for seismic surveys that are repeated in time over the same survey area, e.g. 4D surveys.

While a wire connecting the nodes determines the distance between nodes, it does not ensure that the nodes are deployed along a predetermined path, e.g. along a straight line rather than in a zigzag pattern. As noted, horizontal forces caused by underwater currents make it difficult to control deployment by manipulating the OBC from the surface.

A similar problem with controlling a cable from the surface is encountered when surveying the seafloor using cameras, side scanning radars etc. NO 326789 B1 discloses a submersible survey platform towed by a vessel and controlled to maintain a predetermined height over the seafloor and a predetermined lateral position with respect to the intended path of the cable. The vertical motion is provided by a winch connected to the towing cable, and the horizontal motion required to adjust the course of the platform is provided by side thrusters.

An objective of the invention is to provide an improved method for seismic survey and an improved apparatus for deploying seismic nodes at a seafloor while retaining the benefits of prior art. Further objectives and advantages of the invention will appear from the description. The objectives are achieved by features of the description and the claims.

The invention thus relates to a method for seismic survey by autonomous seismic nodes at a sea floor. According to the invention, the following steps are carried out:
  attaching the seismic nodes to a rope;
  loading the rope with the seismic nodes into a node deployer;
  lowering the node deployer into the sea;
  towing the node deployer above the sea floor;
  deploying the rope with the seismic nodes at the sea floor;
  collecting seismic data by the seismic nodes;
  retrieving the rope with the seismic nodes from the sea floor, and
  unloading seismic data from the seismic nodes.

It is thereby achieved a method for seismic survey by autonomous seismic nodes at a sea floor in which the above mentioned problems related to deploying an OBC from a surface vessel are reduced or eliminated. The invention is thus particularly suited for large depths.

According to a preferred embodiment the seismic nodes are attached to the rope with predefined spacing. This can be done on a vessel. The same vessel can be used for lowering the node deployer into the sea.

The retrieval of the rope with the seismic nodes may be done by connecting a retrieval line to the rope, and hauling the rope into a vessel by the retrieval line. To facilitate this, one or more buoyant connection devices may have been attached to the rope in advance, for the connecting of the retrieval line. This operation may be done by a ROV. It is thereby achieved a rational retrieval of the rope.

After retrieving the rope with the seismic nodes from the sea floor, preferably to a vessel, the seismic nodes can be separated from the rope, and the seismic data unloaded from the seismic nodes.

The invention also relates to a node deployer for subsea towing above a sea floor, for deploying a rope with seismic nodes at the sea floor, comprising a connection device for a towing cable, and a storage for the rope with seismic nodes. According to the invention the storage is a magazine, for packing the rope with the seismic nodes into the magazine while outside the node deployer, and loading the magazine into the node deployer. It is thereby achieved a rational handling of the rope with the seismic nodes.

Preferably the magazine is adapted to a loose packing of the rope, essentially without supporting structures, to minimize packing volume.

The node deployer may be adapted to let rope run out freely when deploying the rope. Alternatively the node deployer is adapted to pay out rope in a controlled way when deploying the rope. The node deployer may comprise one or more deflectors for controlling lateral movement, and one or more flaps for controlling vertical movement during towing. This enables paying out the rope essentially along a line, in a pre-defined position, thereby deploying the seismic nodes in pre-defined positions without dragging the seismic nodes along the sea floor, and also with maintaining the spacing of the seismic nodes.

With the method and the node deployer of the invention the seismic nodes can be placed at the sea floor with greater accuracy than in prior art, which is important for an accurate seismic analysis.

The node deployer may comprise instrumentation to identify obstacles in its path, e.g. a light source and a camera. The node deployer may also comprise a control loop and necessary computer facilities and a control system which steers it away from the obstacles.

Two or more node deployers may be towed by the same vessel, for simultaneously deploying two or more ropes with seismic nodes, for a time and cost efficient deployment of the seismic nodes.

The invention will now be explained with reference to the enclosed drawings, in which:

FIG. 3 illustrates retrieving the rope with seismic nodes from the sea floor, according to the invention;

FIG. 4 illustrates packing the rope with seismic nodes for placing in a magazine, according to the invention;

FIG. 5 illustrates a magazine for the rope with seismic nodes, according to the invention;

Figure 1:
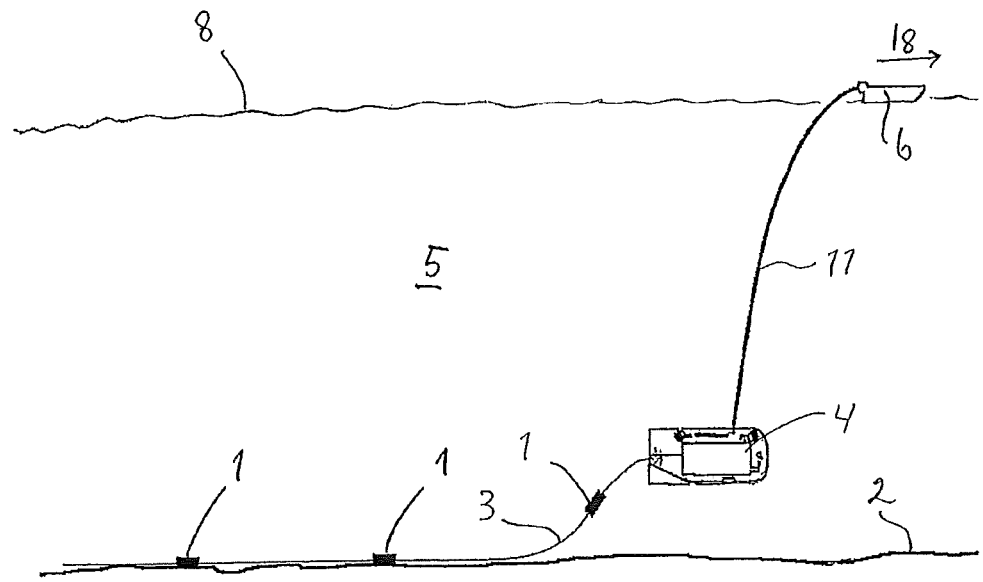
FIG. 1 illustrates towing a node deployer above the a floor, for deploying a rope with seismic nodes at the sea floor by the node deployer, according to the invention.

FIG. 1 illustrates a vessel 6 travelling at a sea surface 8 in a direction 18. The vessel 6 tows a node deployer 4 in the sea 5 by means of a towing cable 11. The node deployer 4 is towed above a sea floor 2, typically at a small height, say a few metres. A rope 3 with seismic nodes 1 is deployed from the node deployer 4, at the sea floor 2. The size of the seismic nodes 1 is exaggerated due to illustrative purpose. The distance between the sea surface 8 and the sea floor 2, i.e. the depth, may be 1000 m or more.

According to the invention, prior to the situation illustrated in FIG. 1, the seismic nodes 1 are attached to the rope 3. The seismic nodes may be attached to the rope while on the vessel 6, or before the seismic nodes and the rope are brought aboard the vessel. For the purpose of attaching the seismic nodes 1 to the rope 3, each seismic node may have a clamp. The clamp may be opened manually or automatically, then the rope may be guided through the clamp, and the clamp is closed, thereby fastening the seismic node to the rope. The seismic nodes may be attached to the rope in predefined positions or with predefined spacing, typically 25-400 m.

The rope 3 with the seismic nodes 1 is then loaded into the node deployer 4, and the node deployer is lowered into the sea 5, to the position shown in FIG. 1, which may be done by an active heave compensated winch. Then the rope 3 with the seismic nodes 1 is deployed from the node deployer 4, as illustrated in FIG. 1.

After the deployment of the rope with the seismic nodes, the node deployer 4 can be removed. A source for seismic signals, e.g. an air gun, may be towed in the sea 5 by a surface vessel, and fired for collecting seismic data by the seismic nodes 1. This is not illustrated. A source for seismic signals, e.g. an air gun, may be towed in the sea 5 by a surface vessel. The seismic nodes are autonomous, i.e. there is no communication to or from the seismic nodes during the collection of seismic data. For collecting seismic data the seismic nodes will typically contain various sensors for measuring the seismic data, e.g. hydrophones, geophones; a power source, e.g. a battery; a clock; an electronic processor for a preliminary processing of the seismic data and managing the seismic node; and memory for storing the seismic data.

Figure 2:
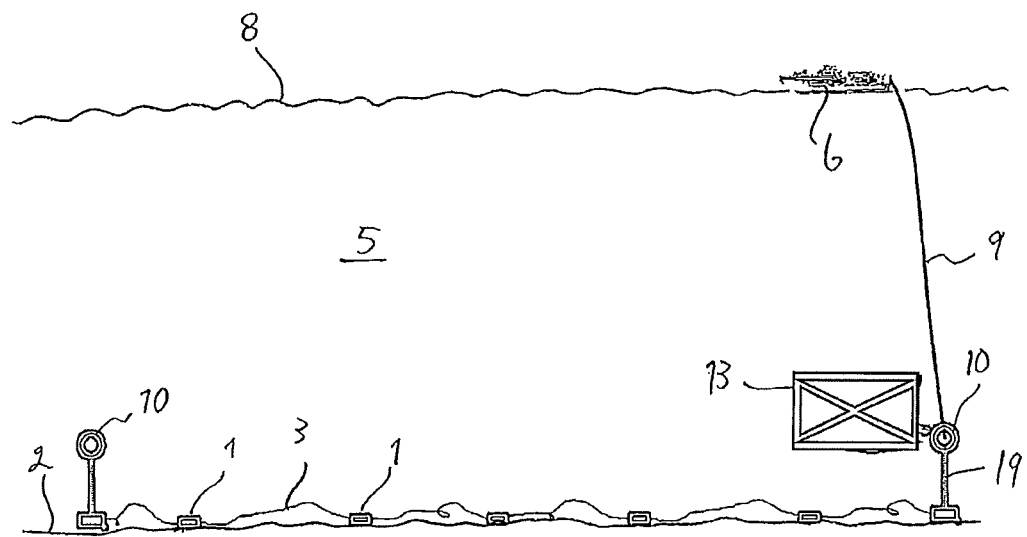
FIG. 2 illustrates connecting a retrieval line to the rope with seismic nodes by a ROV, according to the invention.

FIG. 2 illustrates the situation after the collection of seismic data has been completed, prior to retrieval of the rope with the seismic nodes. A retrieval line 9 has been connected to a buoyant connection device, which in this embodiment is a buoyant ring 10. The ring 10 is attached to the rope 3 by a connection rope 19. The buoyant connection device 10 may be attached to the rope prior to deploying the rope or after deploying the rope. Alternatively the retrieval line 9 could have been connected directly to the rope 3, i.e. the buoyant connection device 10 and the connection rope 19 could have been dispensed with. In the illustrated embodiment, the connecting of the retrieval line is done by a ROV 13. Alternatively the ROV 13 may grip the rope or a seismic node directly to retrieve the rope from the sea floor.

FIG. 2 illustrates two spaced apart buoyant connection devices 10 attached to the rope 3, thereby enabling connecting the retrieval line 9 to the rope 3 in two positions.

In FIG. 3 the rope 3 with the seismic nodes 1 is being retrieved from the sea floor 2, by hauling the rope 3 into a vessel 6 by the retrieval line 9. The vessel 6 is at the sea surface 8, travelling in a direction 18. The retrieval line 9 and the rope 3 with the seismic nodes 1 are typically hauled into the vessel by a winch.

After retrieving the rope with the seismic nodes, the seismic data is unloaded from the seismic nodes. This may be done after separating the seismic nodes from the rope. Unloading of seismic data can be done by manually or automatically connecting the seismic nodes to a computer system aboard the vessel or another place, and then unloading the seismic data.

The node deployer is a construction made from steel, aluminium or composite, comprising a connection device for the towing cable. This connection device may be a pad eye, which enables transferring tension between the towing cable and the node deployer. The node deployer may also have instrumentation for measuring depth, position, pressure and current, and monitoring of the node deployer and surroundings; it may have a processor with a control system, and a connection to a means for communication with the towing vessel. The means for communication with the towing vessel may be an umbilical with optical or electrical signal cables for transferring information. The umbilical may also contain hydraulic conduits or electric cables for power supply. Alternatively the node deployer may have its own power supply, e.g. batteries. The towing cable may be integral with the umbilical.

The node deployer also has a storage for the rope with seismic nodes. According to the invention the storage is a magazine, for packing the rope with the seismic nodes into the magazine while outside the node deployer, and loading the magazine into the node deployer.

FIG. 4 illustrates the principle for packing of the rope 3 with the seismic nodes. The rope is wound around parallel bars 14 in a zigzag pattern. After winding, the rope 3 and the bars 14 are separated. This forms a loosely packed rope without any space-requiring supporting structures. Packing volume is thereby minimized.

FIG. 5 illustrates a magazine 7 for the rope, comprising end walls 15, side walls 16 and a not illustrated bottom, forming an inner space 17 for the rope. The rope may be held together by rubber bands or similar to keep it together during handling and stacking in the magazine.

In one embodiment the bottom of the magazine has holes for the bars 14. Before packing the rope, the bars are placed in the holes, thereby projecting into the magazine. The rope is wound around the bars in a zigzag pattern, and after the winding is completed, the bars are withdrawn from the magazine through the holes in the bottom, thereby leaving the rope loosely packed in the magazine. Alternatively the end walls and the side walls of the magazine may be removed during the winding of the rope, and replaced after the winding is completed.

The node deployer may comprise a frame for the magazine. The magazine may be self-supported or supported by a surrounding structure when in the node deployer.

The loose packing of the rope in the zigzag pattern allows letting the rope run out freely from the magazine in the node deployer during deploying the rope with the seismic nodes at the sea floor. Alternatively the rope may be paid out in a controlled way during deployment. A paying out in a controlled way may be achieved by guiding the rope with the seismic nodes between two rollers which accept the thickness variation of the rope due to the seismic nodes, and controlling the speed of the rollers in accordance with the travelling speed of the node deployer. The rollers may be made of soft rubber, and possibly have an interlocking pattern formed by transverse ribs, in order to enabling gripping both the rope and the seismic nodes.

Figure 6:
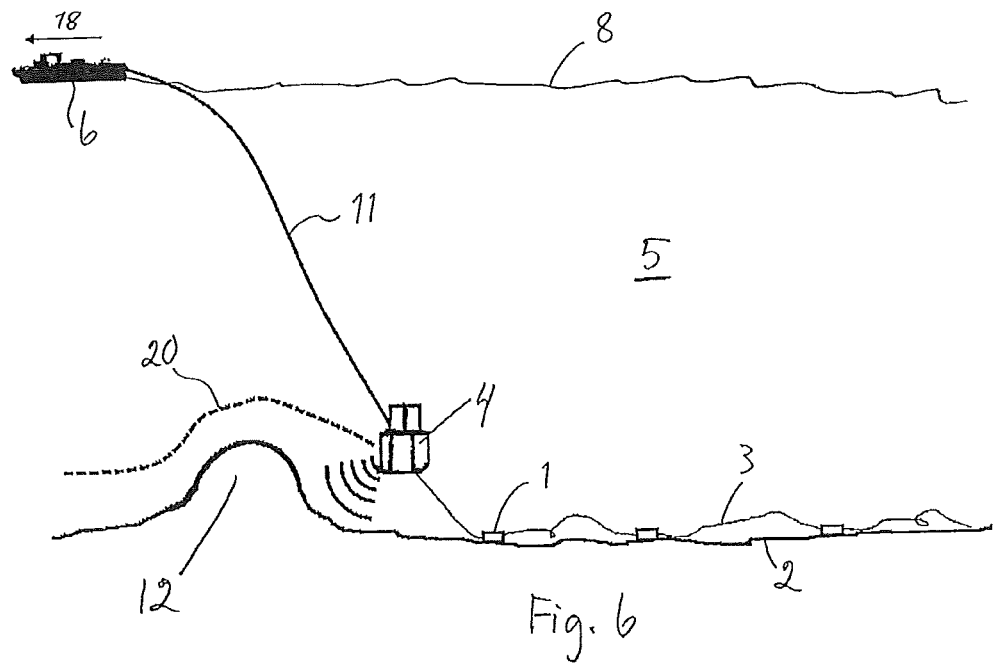
FIG. 6 illustrates towing the node deployer above the sea floor, for deploying the rope with seismic nodes at the sea floor, in a situation in which an obstacle 12 is in front of the node deployer.

FIG. 6 illustrates towing the node deployer 4 above the sea floor 2 in a situation in which an obstacle 12 is in front of the node deployer. The node deployer preferably has instrumentation to identify obstacles in its path. Such instrumentation may be one or more light sources and cameras, or sonar. Preferably the node deployer also has a control loop which steers it away from obstacles in its path. The node deployer is thereby able to adjust its path to a new path 20, and thereby avoid the obstacle 12.

To enable lateral steering of the node deployer, the node deployer preferably has one or more deflectors for controlling lateral movement during towing. The node deployer may also have thrusters for the same purpose. Vertical steering may be achieved by hauling in and letting out the towing cable or umbilical. However, for a more accurate vertical steering, the node deployer preferably has one or more flaps for controlling vertical movement during towing. Thrusters may also be used for vertical steering. The node deployer may have its own navigation system, e.g. an inertial navigation system, or it may be totally controlled from the vessel.

The instrumentation, control system and steering equipment, i.e. deflectors, flaps and/or thrusters, enable deploying the rope in a pre-defined position, and thereby deploying the seismic nodes in pre-defined positions.

Figure 7:
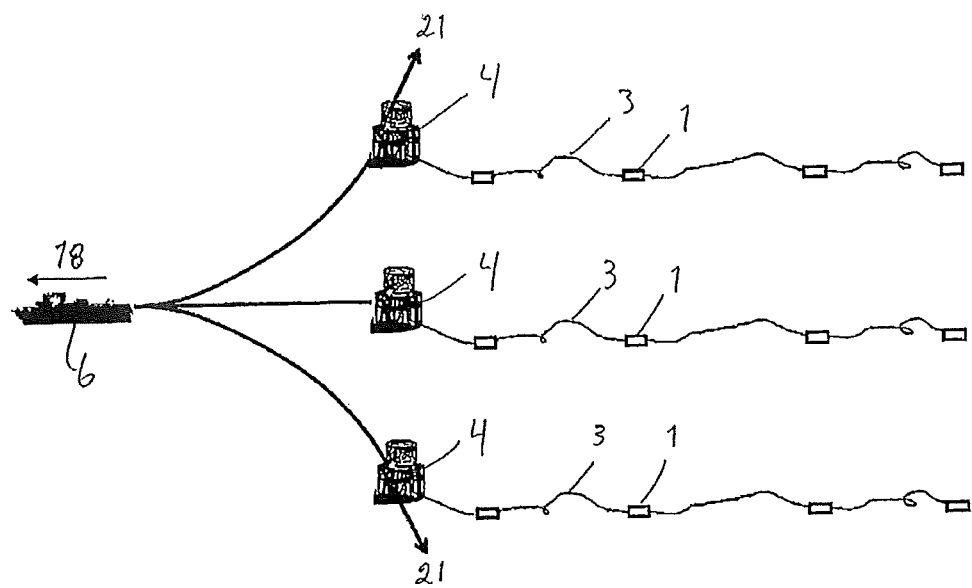
FIG. 7 illustrates towing three node deployers above the sea floor, for deploying three ropes with seismic nodes at the sea floor, according to the invention.

FIG. 7 illustrates a vessel 6 from above, towing three node deployers 4 for simultaneous deploying three ropes 3 with seismic nodes 1. The outer node deployers 4 are held in position by forces 21 from deflectors or thrusters. A typical distance between the ropes is 100-400 m. It is thereby achieved a time-saving and efficient way of deploying seismic nodes at a sea floor.

Figure 8:
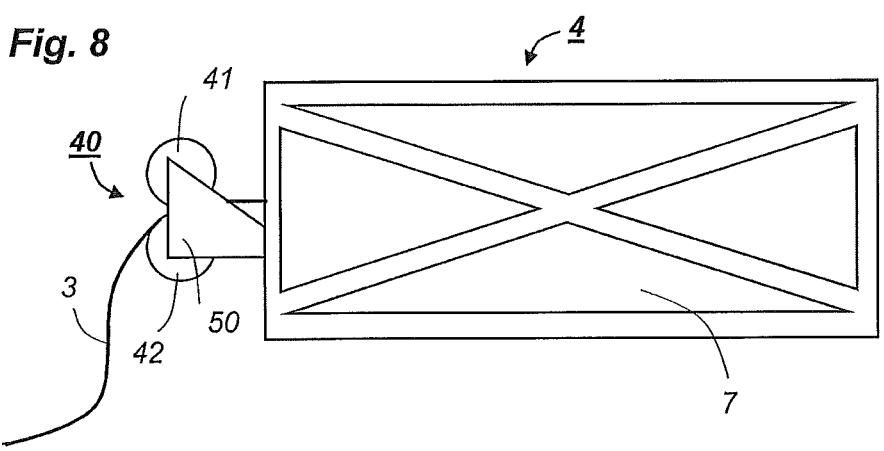
FIG. 8 illustrates a node deployer with a feeding mechanism.

FIG. 8 shows a feeding mechanism 40 for paying out rope 3.

The rope 3 is used for recovering the nodes 1, and has no other purpose. The length of rope 3 between the nodes 1 is longer than the intended distance between the nodes 1 on the seafloor, and the feeding mechanism 40 comprises two rollers 41, 42 driven by a motor arranged to pull the rope 3 out of the magazine 7 at a speed greater than the vessel speed. This ensures that the node deployer 4 does not pull on the deployed rope 3, and that the nodes 1 attached to the rope 3 are dropped to the seafloor. Thereby, a node may be lost or misplaced without affecting subsequent nodes.

Figure 9A:
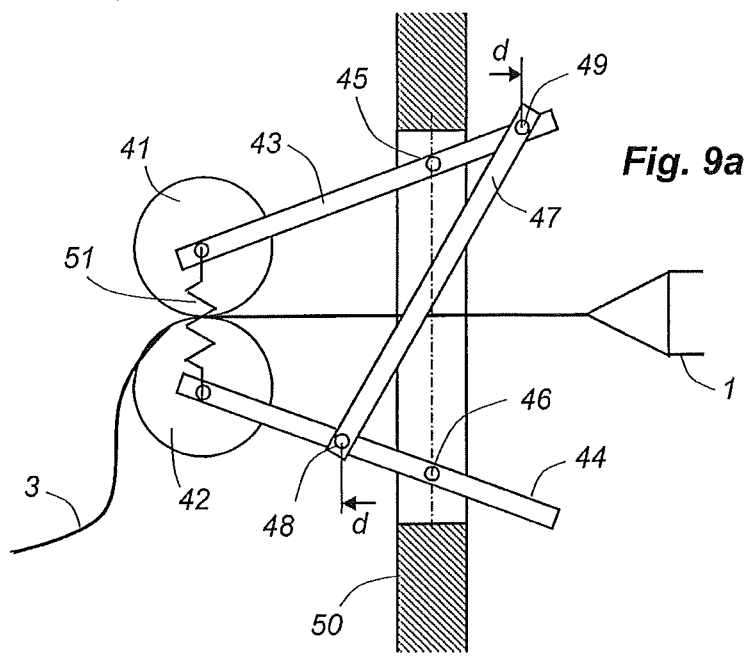
FIG. 9a shows the feeding mechanism in FIG. 8 in a first state.

FIG. 9*a* shows the feeding mechanism 40 in greater detail. The two rollers 41, 42 are attached at distal ends of respective arms 43, 44. The arms 43, 44 are hinged to a support 50 through hinges 45, 46 with rotation axes parallel to the rotation axes of the rollers 41, 42. The support 50 is fixed to the node deployer 4. A rod 47 connects the arms 43, 44 through rotation axes 48 and 49 parallel to those of the hinges 45, 46.

Figure 9B:
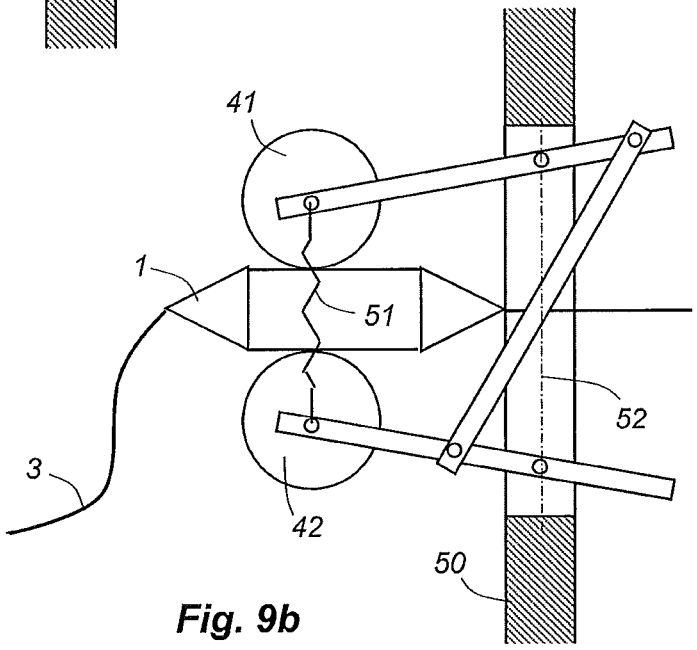
FIG. 9b shows the feeding mechanism in FIG. 8 in a second state.

FIG. 9*b* illustrates the effect of the rod 47. When a node 1 passes between the rollers 41, 42, roller 41 is pushed upward such that arm 43 rotates about the hinge 45. The opposite, i.e. proximal, end of arm 43 pushes on the rod 47. The axes 48 and 49 are placed at equal distances d on opposite sides of the axis 52 through the hinges 45, 46, such that the roller 42 is pushed exactly the same distance as roller 41, but in the opposite direction.

A spring 51 provides a spring force to ensure a safe grip on the rope 3 (FIG. 9a) and node 1 (FIG. 9b)

The rollers 41, 42 are preferably made of a soft rubber or a similar material.

Figure 10:
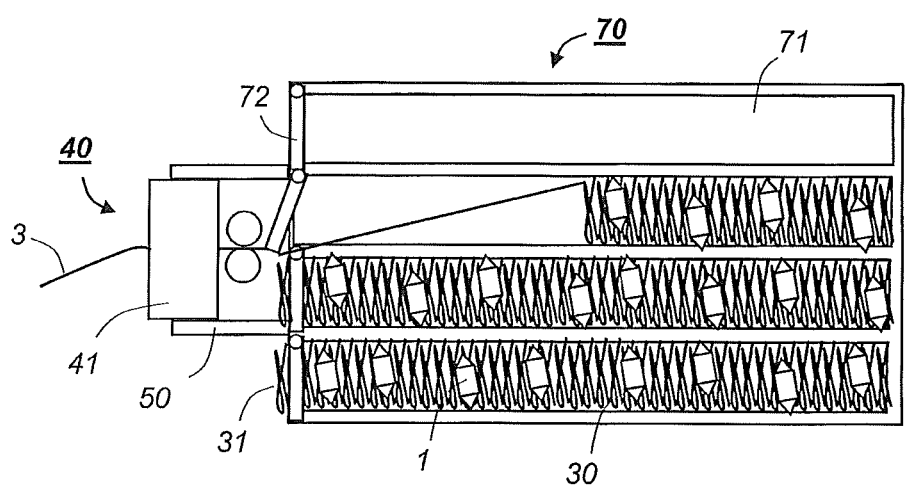
FIG. 10 illustrate a magazine for a node deployer.

FIG. 10 illustrates a preferred embodiment of the magazine 7. More particularly, FIG. 10 shows a tray 70 seen from above. Several such trays 10 are set upon each other to form the magazine 7.

The tray 70 comprises several compartments 71, which are open at the top. Each compartment is also provided with a retainer configured to provide a tension to the rope 3, e.g. a spring loaded door 72.

The nodes 1 and rope 3 constitutes one, continuous length through the entire magazine 7, and is coiled in suitable coils 30, each fitting in a compartment 71. The coils 30 are conveniently placed in the compartment 71, which is open at the top.

FIG. 10 illustrates a state where the feeding mechanism 40 described above pays out the nodes 1 and rope 3. The compartment 71 at the top of FIG. 10 has been emptied The second compartment 71 from the top in FIG. 10 is being emptied. A retainer, e.g. the spring loaded door 72, provides tension to the rope 3, such that the nodes 1 and rope 3 leaves the compartment in an orderly fashion. A length of rope 31 blocks the doors 72 to the compartments that will be emptied later.

While the invention has been described with reference to examples, the scope of the invention is defined by the accompanying claims,

The invention claimed is:

1. A method for seismic survey by autonomous seismic nodes at a sea floor, comprising:
    attaching the autonomous seismic nodes to a rope with a predefined spacing between the seismic nodes, the autonomous seismic nodes comprising a recorder, a memory for storing seismic signals and a power source and the autonomous seismic nodes are detachably connected to the rope;
    loading the rope with the autonomous seismic nodes into a magazine;
    loading the magazine into a node deployer, wherein the node deployer comprising one or more deflectors for controlling lateral movement of the node deployer during towing, the node deployer comprising one or more flaps to control vertical movement during towing, the node deployer comprising instrumentation to identify obstacles, the node deployer being connected to a vessel at a sea surface by tow cable, and the node deployer is configured to control the rope deploying out of the magazine at a rate of freely or faster than a speed of the node deployer to deploy the autonomous seismic nodes in pre-defined positions and maintaining spacing of the autonomous seismic nodes while preventing dragging the autonomous seismic nodes along the sea floor;
    lowering the node deployer into the sea from the vessel;
    towing the node deployer above the sea floor by the vessel;
    steering the node deployer away from obstacles detected by the instrumentation to identify obstacles;
    deploying the rope with the autonomous seismic nodes from the magazine at the sea floor in pre-defined positions and maintaining spacing of the autonomous seismic nodes while preventing dragging the autonomous seismic nodes along the sea floor;
    collecting seismic data by the autonomous seismic nodes;
    retrieving the rope with the autonomous seismic nodes from the sea floor; and
    unloading seismic data from the autonomous seismic nodes.

2. The method of claim 1, wherein attaching the autonomous seismic nodes to the rope is done on a vessel.

3. The method of claim 1, wherein the rope is held together by rubber bands or similar to keep it together during handling and stacking in the magazine.

4. The method of claim 1, wherein the node deployer is lowered into the sea by an active heave compensated winch.

5. The method of claim 1, wherein deploying the rope with the autonomous seismic nodes at the sea floor is done by letting the rope run out freely.

6. The method of claim 1, wherein deploying the rope with the autonomous seismic nodes at the sea floor is done by paying out the rope in a controlled way.

7. The method of claim 1, wherein retrieving the rope with the seismic nodes from the sea floor is done by hauling the rope into a vessel.

8. The method of claim 7, wherein the vessel is at the sea surface.

9. The method of claim 8, comprising connecting a retrieval line to the rope, and hauling the rope into the vessel by the retrieval line.

10. The method of claim 9, comprising attaching a buoyant connection device to the rope, and connecting the retrieval line to the buoyant connection device.

11. The method of claim 10, comprising attaching multiple spaced apart buoyant connection devices to the rope, for enabling connecting the retrieval line to the rope in multiple positions.

12. The method of claim 1, comprising the use of a ROV.

13. The method of claim 12, wherein the ROV grips the rope or one of the autonomous seismic nodes.

14. The method of claim 1, comprising separating the autonomous seismic nodes from the rope after retrieving the rope with the autonomous seismic nodes from the sea floor.

15. The method of claim 1, wherein two or more node deployers are towed by a vessel, for simultaneously deploying two or more ropes with the autonomous seismic nodes.

16. A node deployer for subsea towing above a sea floor, for deploying a rope with autonomous seismic nodes at the sea floor, comprising:
    a frame;
    a connection device for a towing cable connected to the frame;
    a magazine containing the rope with the autonomous seismic nodes, the autonomous seismic nodes comprising a recorder, a memory for storing seismic signals and a power source and the autonomous seismic nodes are removably connected to the rope, wherein the frame is configured to removably hold the magazine so that the rope with the autonomous seismic nodes can be packed into the magazine while the magazine is outside the node deployer and then loading the magazine into the node deployer, and wherein the node deployer comprising one or more deflectors for controlling lateral movement of the node deployer during towing, the node deployer comprising one or more flaps to control vertical movement during towing, the node deployer comprising instrumentation to identify obstacles, the node deployer being connected to a vessel at a sea surface by tow cable, and the node deployer is configured to control the rope deploying out of the magazine at a rate of freely or faster than a speed of the node deployer to deploy the autonomous seismic nodes in pre-defined positions and maintaining spacing of the autonomous seismic nodes while preventing dragging the autonomous seismic nodes along the sea floor.

17. The node deployer of claim 16, wherein the node deployer is adapted to let rope run out freely when deploying the rope.

18. The node deployer of claim 16, wherein the node deployer is adapted to pay out rope in a controlled way when deploying the rope.

19. The node deployer of claim 16, comprising one or more deflectors for controlling lateral movement during towing.

20. The node deployer of claim 16, comprising a control loop which steers it away from obstacles in its path.

21. The node deployer of claim 16, further comprising a feeding mechanism for paying out rope, the feeding mechanism comprising two rollers driven by a motor arranged to pull the rope out of the magazine at a speed greater than the vessel speed.

22. The node deployer of claim 21, wherein the rollers are configured to move an equal distance in opposite directions to allow a node to pass between them.

23. The node deployer of claim 21, wherein the rollers are biased by a spring to provide a safe grip on the rope and node.

24. The node deployer of claim 23, wherein the magazine comprises a plurality of trays configured to be set upon each other, wherein each tray is configured to receive a length of rope connecting the autonomous seismic nodes, which rope extends through the entire magazine.

25. The node deployer of claim 24, wherein the tray comprises a plurality of compartments, each configured to receive a coil of the rope with the associated autonomous seismic nodes.

26. The node deployer of claim 24, wherein the tray is open at the top for facilitating loading of the autonomous seismic nodes and rope.

27. The node deployer of claim 24, further comprising a retainer configured to provide a tension to the rope as the rope leaves the magazine.

28. The node deployer of claim 27, wherein the retainer is a spring loaded door.

* * * * *